June 2, 1931. H. M. WATKINS 1,808,699
WINDOW GLASS CHANNEL
Filed June 19, 1930
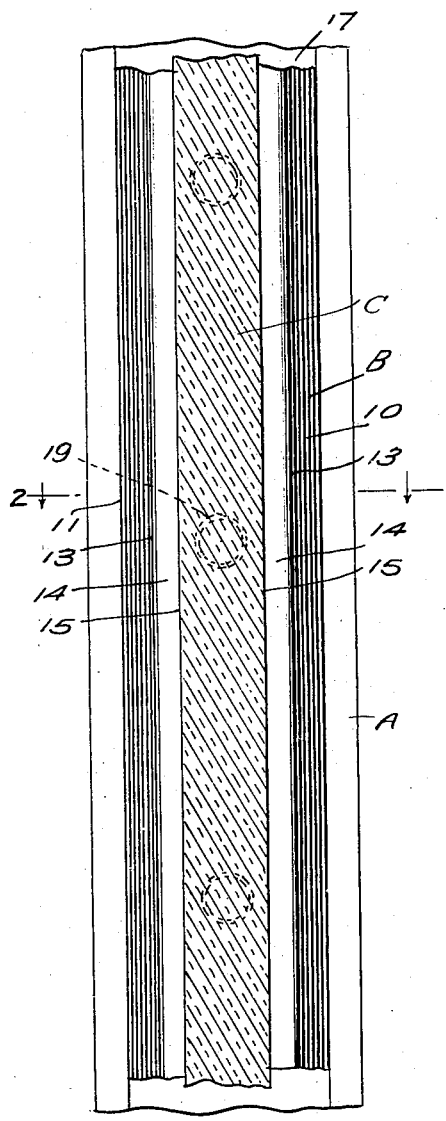
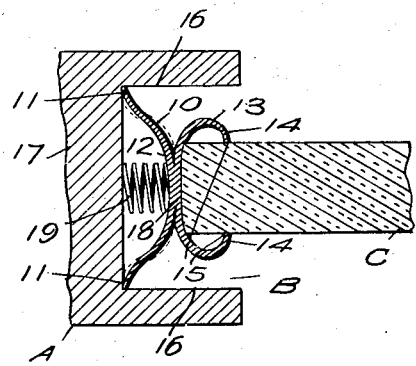
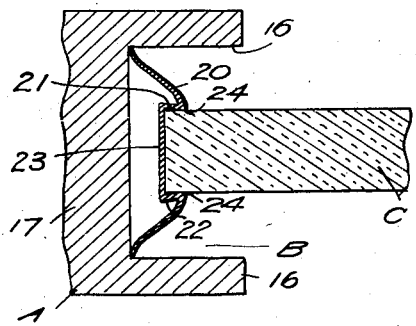
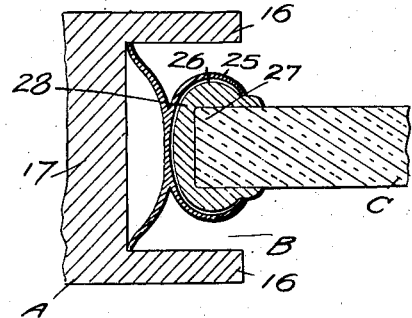
Inventor
HUGH MOSS WATKINS
By Linton, Kellogg & Smith
Attorneys Patented June 2, 1931

1,808,699

UNITED STATES PATENT OFFICE

HUGH MOSS WATKINS, OF LAKE CHARLES, LOUISIANA

WINDOW GLASS CHANNEL

Application filed June 19, 1930. Serial No. 462,350.

The invention relates to a panel or door mounting, and more especially to the mounting and weatherstripping of window glasses or the like adaptable for use in conjunction with the doors, windows or other openings of automobiles, buses, street cars, cabs, trucks, airplanes, buildings or any other structure having windows or doors provided with sliding glass openings.

The primary object of the invention is the provision of a mounting of this character, wherein the construction thereof is novel so as to eliminate the use of felt, rubber or other similar material and at the same time, the glass or panel is protected from breakage or damage, while chattering or rattling is obviated.

Another object of the invention is the provision of a metal mounting of this character, wherein the glass or panel can be readily raised or lowered within the channels therefor in the window or door, and such mounting does not require any change or alteration in the make-up of the channel adjuncts or the door or window.

A further object of the invention is the provision of a mounting of this character, wherein the same can be applied to a window or door without the use of fasteners, the said mounting being self-gripping both in the channels for the glass or panel and on the latter.

A still further object of the invention is the provision of a mounting of this character, wherein the construction thereof is novel in form to render the opening for the glass or panel weatherproof and said mounting being self-adjusting to accommodate itself to varying thicknesses of glass or panels, thus relieving extreme care and expense of grinding the edges to a perfect fit both in original fitting and replacement.

A still further object of the invention is the provision of a mounting of this character, which is extremely simple in construction, thoroughly reliable and efficient in its purposes, strong, durable, readily and easily applied and removed, neat and attractive in appearance, and inexpensive to manufacture and install.

With these and other objects in view the invention consists in the features of construction, combination and arrangement of parts as will be hereinafter more fully described, illustrated in the accompanying drawings, which disclose the preferred and modified embodiments of the invention, and pointed out in the claims hereunto appended.

In the accompanying drawings:—

Figure 1 is an elevation of a section of window casing having applied a mounting constructed in accordance with the invention;

Figure 2 is a sectional view on the line 2—2 of Figure 1;

Figure 3 is a view similar to Figure 2, showing a slight modification; and

Figure 4 is a view similar to Figure 2 showing a further modification.

Similar reference characters indicate corresponding parts throughout the several views in the drawings.

Referring to the drawings in detail, A designates a portion of a common type of wood or metal window casing of an automobile body, or other structure, and is merely shown for illustrating purposes of the application of the mounting hereinafter fully described.

Within the channel or groove B, for a glass or panel C supported in the casing A, is located the mounting which comprises a convexed resilient supporting or base strip 10, preferably formed from light resilient or spring metal and slightly tapers from its median to the free edges 11 thereof, while integrally formed at the median 12 of the supporting or base strip is a channeled glass gripping strip 13, the side walls 14 of which are curled outwardly and inwardly to constitute free gripping edges 15 opposing each other to contact with opposite faces of a sliding glass or panel C. The glass gripping strip 13 is made of a metal similar to that of the base strip 10, but somewhat heavier and the inner face thereof could be lined with a soft metal (not shown) in order to prevent friction between the glass and its points of contact with the gripping strip. The side walls 16 of the groove or channel B, are parallel and at right angles to the base 17 of said groove or channel, the gripping strip 13 being of considerably less width than the supporting or base strip 10, so that the side walls 14 and their gripping edges 15 will be spaced from the parallel sides 16 of the groove or channel B for free action on the glass C.

The median 18 of this gripping strip 13 serves as an abutment for the edge of the glass or panel C on entrance thereof in the gripping strip and the impact of the glass or panel on sliding movement into said gripping strip against the median 18 tensions the supporting strip or base strip 10, thus causing pinching action of the gripping edges 15 upon opposite faces of the glass or panel, so that in this manner, the latter will be firmly grasped and held tightly, while at the same time, the opening in the window casing A, for the glass or panel, will be rendered weatherproof.

The supporting or base strip 10 is compressed so as to frictionally engage itself in the groove or channel B, in the casing, and thus be securely held fast therein without the use of fasteners or other separate securing members ordinarily employed in the mounting of weatherstripping.

In Figure 3 of the drawings, there is shown a slight modification of the invention, wherein the supporting or base strip 20 is outwardly arched and in its median there is countersunk groove or channel 21, the side walls 22 of which are normally parallel but on impact of the glass or panel against the base 23 of said groove or channel 21, the apexes 24 of said side walls 22 will approach each other and form grippers for the opposite faces of the said glass or panel when its edge is introduced in the groove or channel, as will be apparent.

In Figure 4 of the drawings, there is shown a further modificaiton of the invention, wherein the gripping strip 25 is of approximately semi-circular formation forming therein a relatively wide and deep channel or groove 26 for accommodating the edge of the glass or panel, which edge 27 is capped with a metallic reinforcing strip 28, thus effecting metal to metal contact of the gripping strip and glass or panel. The action of this modification just described is identical with the preferred and first-named modified forms of the invention.

To make the side walls of the glass gripping strip have a more positive gripping action upon the glass mounted therein, I may and have herein shown, in Figures 1 and 2, coil springs 19, as arranged in the proper spaced relation between the base strip 10 and the medial wall of the channel or groove B. The tension against the median 12 of the gripping strip may be increased by substituting a long leaf spring (not shown) for these coil springs 19.

It is to be understood, of course, that it is contemplated within the scope of this invention to have the mounting lined with some suitable material in order that the glass or panel mounted therein may slide more easily, if found necessary, or only the apexes 15 and 24 may be tipped with a suitable material to prevent friction. This mounting is also adapted for stationary glass where the frame is subject to strain or wrenching, such as experienced in windshields or windows of automobiles, airplanes, or the like. The structural make-up of the mounting will keep the glass from rattling or chattering and at the same time, allow the glass to yield to the motion of any strain and prevent it from breaking.

Manifestly, the construction shown is capable of considerable modification, and such modification as is within the scope of my claims, I consider within the spirit of my invention.

I claim:—

1. A mounting of the kind described, comprising a convexed resilient supporting strip adapted to be frictionally locked within a window panel or glass guide channel, and a resilient gripping strip formed with the supporting strip to grasp the edge of a panel or glass when introduced into the last named strip and through impact with the median of the latter.

2. A mounting of the kind described, comprising a convexed resilient supporting strip adapted to be frictionally locked within a window panel or glass guide channel, a resilient gripping strip formed with the supporting strip to grasp the edge of a panel or glass when introduced into the last named strip and through impact with the median of the latter, and tapered edges formed on the supporting strip, the side walls of the gripping strip being constructed and arranged to effect opposed grippers.

3. In combination with a window casing having a channel and a window glass plate slidable therein, a mounting for said glass plate formed from a strip of resilient sheet metal, said mounting consisting of a base portion having a width which is normally greater than that of the channel of the window casing, and adapted to be received within said channel, a glass gripping strip formed with said base and being made from metal slightly heavier than that of the base of said mounting, and said glass gripping strip adapted to have gripping contact with the opposite sides of the glass plate when the latter is mounted therein, and said mounting is arranged within the channel of the window casing.

4. In combination with a window casing having a channel and a window glass plate slidable therein, a mounting therefor consisting of a base portion adapted to be received within the groove of said window casing, a glass gripping member formed with said base for receiving the glass plate and springs arranged between one wall of the channel of the window casing and the base of said mounting, substantially as and for the purpose specified.

5. A mounting of the kind described, comprising a convexed resilient supporting strip formed from light resilient metal slightly tapering from its median to the free edges thereof, adapted to be frictionally locked within a window panel or glass guide channel, a resilient gripping strip formed integrally with said supporting strip, and free gripping edges formed with said resilient gripping strips to grasp the opposing faces of a panel or glass when introduced into the resilient gripping strips and through impact with the median of the latter.

6. A mounting of the kind described, comprising a convexed supporting resilient strip adapted to be frictionally locked within a window panel or glass guide channel, the medial portion of said supporting strip being formed with a countersunk groove or channel for receiving the panel or glass and the opposed walls of said groove of channel caused to effect a grasping action upon the panel or glass when introduced into said groove or channel and through impact with said supporting strip.

7. A mounting of the kind described comprising a supporting or base strip being formed of light resilient metal adapted to be frictionally locked within a window panel or glass guide channel, said base strip being countersunk or channeled at its median for receiving a panel or glass when introduced therein, grippers formed with said base strip and adapted to grasp the opposed faces of a panel or glass when introduced within the channel and through impact therewith.

In witness whereof I have hereunto set my hand.

HUGH MOSS WATKINS.